3,489,571
METHOD OF MAKING BEAN CHIPS
Evelyn J. Hannum, 3880 S. Hillcrest,
Denver, Colo. 80237
No Drawing. Filed July 11, 1966, Ser. No. 563,990
Int. Cl. A23l *1/20*
U.S. Cl. 99—98                9 Claims

ABSTRACT OF THE DISCLOSURE

Baked or toasted wafers or chips are made from dried beans, particularly lima beans, by a method which includes soaking the beans and removing their skins, then grinding them and forming a paste which is then cooked in a pressure cooker, the resulting loaf or mass is formed into chips or the like and baked preferably in a vacuum oven before which a preheating step may be employed. The resulting chip retains the delicate bean flavor and is sufficiently firm for dipping use with pastes or spreads.

---

My invention relates to the making of toasted wafers or chips and particularly to an improved method for making baked or toasted chips from dried beans.

Chips, flakes or toasted wafers of various cereals and other vegetable foods have become popular as snacks and for use as carriers for appetizers, "dips" and the like. For this purpose, particularly for use as carriers for dips, it is desirable that the chips have sufficient strength to resist breaking or crumbling when the dip is applied. Some efforts have been made to employ dried beans for this purpose but have not proved entirely satisfactory for various reasons. Furthermore, certain beans, for example, have a pleasant delicate flavor but it has been found very difficult to produce a chip or wafer having the required physical characteristics including a desirable texture and which also retain a true bean flavor. Accordingly, it is an object of my invention to provide an improved method for making chips or wafers from dried beans.

It is another object of my invention to provide an improved method for producing chips or wafers from dried beans while retaining the true flavor of the bean.

It is another object of my invention to provide an improved method for making chips or wafers from dried beans which is simple and effective and produces a chip of good and pleasing texture and of natural flavor.

Briefly, in carrying out the objects of my invention in one example thereof I provide a quantity of dried beans such as dried lima beans, soak them in cold water until their weight has about doubled, and then remove their hulls and grind them very fine, add flavoring and a binder, and cook the mass in a suitable container. I then slice the resulting loaf into chips, heat the chips briefly at a temperature of the order of 375° F. and then dry and brown them in a vacuum oven at a lower temperature.

The features of novelty which characterize my invention are pointed out with particularity in the claims annexed to and forming a part of this specification. The invention itself, however, together with further objects and advantages thereof, will best be understood from the following detailed description.

Dried beans have relatively high food value and are rich in proteins. The physical characteristics of the bean are such that when ground into a flour it does not lend itself to general use in the manner of cereal flours but rather tends to render baked products made therefrom fragile or crumbly. After much testing in the field of making chips or toasted wafers from beans I discovered that by employing the process of my invention as described below I could make a bean chip of pleasing texture, sufficiently strong to be used as a carrier for dips and the like, and which in addition retained the characteristic delicate bean flavor. The process of my invention can be used, for example, with many varieties and sizes of bean; however, I prefer to use the lima bean both because of its large size and because the chips made with lima beans are of a desirable texture and have a very desirable natural bean flavor.

In order to prepare the beans for grinding they are first soaked in water, preferably cold, until their weight has doubled. The skin and meat of the bean are then soft and the beans are readily hulled. After the beans have been hulled, all excess water is removed and a batch of the hulled beans is placed in a blender. A binder, such as wheat starch, and salt and cooking oil are then added to the beans in the blender and the blender is operated to grind the beans and additives to a fine paste. The quantities of binder, salt and cooking oil are added in ratios to a cup of hulled beans of one-fourth teaspoon of the binder, one-half teaspoon salt, and about two tablespoons of cooking oil. I have found that safflower oil is very satisfactory as the cooking oil. The thoroughly blended ingredients are then placed in a suitable container for cooking. Initial cooking is effected in a pressure cooker at pressures within a range of about ten to fifteen pounds per square inch and is continued for about one hour.

This effects a complete cooking of the bean mixture to provide a loaf which is then removed from the container and cut or sliced into chips or flakes of the desired size. The chips or flakes are then placed on a cooking sheet or tray and are salted and then heated in an oven for about ten minutes at about 375° F., which effects a thorough heating of the thin slices and facilitates the operation of a vacuum oven in which they are placed next by preventing a drop in the oven temperature. The heated slices are then placed in the vacuum oven operated at a temperature within a range of about 240° to 290° F. and at an absolute pressure of, say, twenty-four inches of mercury. Heating in the vacuum oven for a period of fifteen to twenty minutes effects a removal of the moisture from the chips and also browns them to some extent. The amount of time for heating in the vacuum oven is selected in accordance with the thickness of the slices and their moisture content. The heating and browning in the vacuum oven effects the required final moisture removal and cooking of the slices while retaining the delicate bean flavor.

I have found that the final moisture removal may be effected by placing the thin slices of the cooked bean loaf on a cooking sheet and baking them in a standard oven at about 300° F. for a period of about twenty minutes. When employing the standard oven the step of preheating the chips to about 375° F. is not essential. The chips cooked in this manner are somewhat heavier than those cooked in the vacuum oven, but I have found that by employing temperatures as low as 300° F. the bean flavor may be reasonably well preserved.

The chips cooked in accordance with the preceding process are crisp, tender and golden brown. They possess the desirable bean flavor and have an interesting texture which may be characterized as slightly grainy. The chips are sufficiently strong to be employed as dip carriers in a manner essentially the same as potato chips.

I claim:

1. The method of producing from dried beans, toasted chips having sufficient strength for use as dip carriers and for retaining the flavor of the bean which comprises the steps of soaking a quantity of dried beans in water for a period of time until their weight has substantially doubled, removing the skins and any excess water from the meats of the beans, adding cooking oil, salt and a small amount of binder and thoroughly grinding the meats therewith to form a paste, placing the paste in a mold and cooking it in a pressure cooker at pressures in the range of about ten to fifteen pounds per square inch for about one hour to form a cooked loaf, cooling the loaf and slicing it into chips of the desired size, and baking the chips at a low temperature in the range of about 240° F. to 300° F. to remove moisture therefrom and to effect a browning of the chips.

2. The method of producing toasted chips from dried beans as set forth in claim 1 wherein the dried beans are lima beans.

3. The method of producing toasted chips from dried beans as set forth in claim 1 wherein the step of baking the chips at low temperature is effected in a vacuum oven and including the step of heating the chips in an oven at a temperature of the order of 375° F. for a period of the order of ten minutes before placing them in the vacuum oven.

4. The method of producing toasted chips from dried beans as set forth in claim 1 wherein the step of baking the chips at low temperature is effected in a vacuum oven under an absolute pressure of the order of twenty-four inches of mercury and at temperatures within a range of about 240° to 290° F.

5. The method of producing toasted chips from dried beans as set forth in claim 4 wherein the dried beans are lima beans and the binder is wheat starch.

6. The method of producing toasted chips from dried beans as set forth in claim 2 wherein the quantities of binder, salt and cooking oil for each cup of hulled beans is as follows: about one-fourth teaspoon binder, about one-half teaspoon salt and about two tablespoons cooking oil.

7. The method of producing toasted chips from dried beans as set forth in claim 6 wherein the step of baking the chips at low temperature is effected in a vacuum oven under an absolute pressure of the order of twenty-four inches of mercury and at temperatures within a range of about 240° to 290° F.

8. The method of producing from dried beans toasted chips and the like having sufficient strength for use as dip carriers and for retaining the flavor of the bean which comprises the steps of soaking a quantity of dried beans in water for a period of time until their weight has substantially doubled, removing the skins and any excess water from the meats of the beans, adding cooking oil, salt and a small amount of binder and thoroughly grinding the meats therewith to form a paste, cooking the paste in a pressure cooker at pressures in the range of about ten to fifteen pounds per square inch for about one hour to form a cooked body, forming the cooked body into thin pieces of the desired size, and baking the pieces at a low temperature in the range of about 240° F. to 300° F. to remove moisture therefrom and to effect a browning of the pieces.

9. The method of producing toasted chips and the like from dried beans as set forth in claim 8 wherein the step of baking the pieces at low temperature is effected in a vacuum oven under an absolute pressure of the order of twenty-four inches of mercury and at temperatures within a range of about 240° F. to 290° F.

References Cited
UNITED STATES PATENTS

| | | | |
|---|---|---|---|
| 2,685,519 | 8/1954 | Moore | 99—126 |
| 3,282,701 | 11/1966 | Wong et al. | 99—80 |

RAYMOND N. JONES, Primary Examiner

WILLIAM A. SIMONS, Assistant Examiner

U.S. Cl. X.R.

99—100